Jan. 30, 1951  W. A. BAILEY  2,539,606
PROTECTIVE COVER FOR ANIMALS
Filed May 24, 1948

INVENTOR.
WILBA A. BAILEY
BY
Wm H Dean
AGENT

Patented Jan. 30, 1951

2,539,606

UNITED STATES PATENT OFFICE 2,539,606

PROTECTIVE COVER FOR ANIMALS

Wilba A. Bailey, National City, Calif.

Application May 24, 1948, Serial No. 28,795

10 Claims. (Cl. 119—143)

My invention relates to protective cover for animals, more particularly for use in connection with female dogs or the like, and the objects of my invention are:

First, to provide a cover of this class which protects female dogs or other animals from breeding with undesirable specimens.

Second, to provide a cover of this class which fully protects an animal and yet permits freedom of the animal in normal walking movements.

Third, to provide a protective of this class which is very simple and easy to install in connection with an animal and which does not become easily removed.

Fourth, to provide a cover for animals of this class which is positively maintained longitudinally of the animal's body by neck and tail openings therein located about the neck and tail of the animal while straps positively locate the cover vertically on the animal's body so that the displacement thereof may not be accomplished by other animals.

Fifth, to provide a protective cover for animals of this class which serves as an all purpose garment for various animals such as short haired dogs or the like, and Sixth, to provide a protective cover for animals of this class which is very simple and economical of construction, efficient in operation, and which will not readily deteriorate or get of order.

Figure 1:
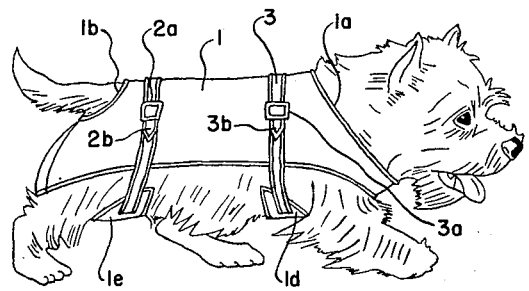
Figure 2:
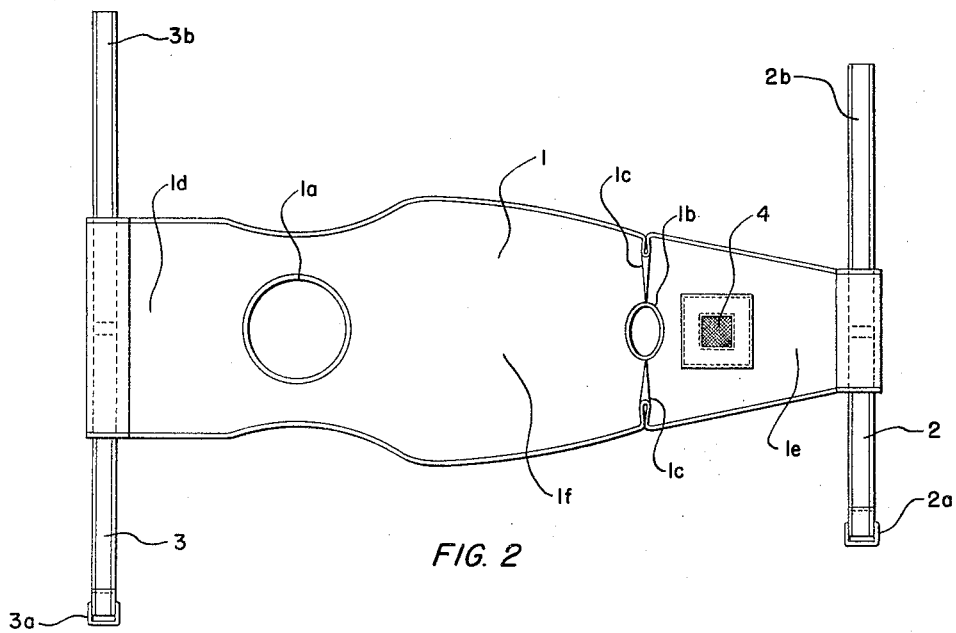

With these and other objects as will appear hereinafter, my invention consists of certain novel features of construction, combination and arrangement of parts and portions as will be hereinafter described in detail and particularly set forth in the appended claims, reference being had to the accompanying drawings, and to the characters of reference thereon forming a part of this application in which:

Figure 1 is a side elevational view of my protective cover for animals shown on a dog. Figure 2 is a side elevational view of my protective cover showing the same in open flat position.

Similar characters of reference refer to similar parts and portions throughout the several views of the drawing.

The cover 1, straps 2 and 3, and the pad 4 constitute the principal parts and portions of my protective cover for animals.

The cover 1 is a flat piece of material preferably made of fabric or other material of flexible character. The rear end of this cover 1 is connected with the strap 2 which is disposed transversely of the longitudinal axis of the cover 1 and extending from opposite sides thereof. This strap 2 is provided with a buckle 2a on one end and an insertion portion 2b on the opposite end adapted to be extended through the buckle 2a. The forward end of the cover 1 is connected with the strap 3 having a buckle 3a on one end and an insertion portion 3b adapted to engage the buckle 3a on the opposite end of the strap 3. It will be noted that the strap 3 extends laterally of the longitudinally axis of the cover 1 on both sides thereof, all as shown best in Figure 2 of the drawings. Near the strap 3 the cover 1 is provided with a neck opening 1a therethrough and near the strap 2 the cover 1 is provided with a tail opening 1b therethrough. At opposite sides of the tail opening 1b are angular tucks 1c which provide a curved formation on the cover 1 adapted to fit the rump of the animal when positioned thereon as shown in Figure 1 of the drawings. Rearwardly of the tail opening 1b is the pad 4 which is a conventional absorbant fabric pad. As shown in Figure 1 of the drawings, the cover 1 extends over the back of the dog and the neck of the dog projects through the neck opening 1a while the tail of the dog projects through the tail opening 1b. The cover 1 forwardly of the neck opening 1a is provided with a chest cover portion 1d which extends downwardly and underneath the dog's chest between his legs as shown in Figure 1 of the drawings. The oppositely extending portion 3a and 3b of the strap 3 extend over the dog's back and the central portion of the cover 1 intermediate the neck and tail openings 1a and 1b respectively. In this position, opposite ends of the strap 3 are connected by inserting the insertion end 3b through the buckle 3a, all as shown best in Figure 1 of the drawings. Rearwardly of the tail opening 1b, the belly cover portion 1e of the cover 1 extends downwardly and forwardly between the rear legs of the dog, and opposite ends of the strap 2 extend upwardly over the dog's back above the intermediate portion of the cover 1 just forwardly of the tail opening 1b as shown best in Figure 1 of the drawings. The strap 2 in this position is connected by inserting the end 2b through the buckle 2a which maintains the rear portion of the animal positively covered and protected at all times.

The operation of my protective cover for animals is substantially as follows:

When worn in the position shown in Figure 1 of the drawings by the dog or other animal, the neck and tail openings 1a and 1b in the cover 1 positively locate the cover longitudinally of the animal. The belly and chest cover portions 1e and 1d respectively maintain opposite ends of the cover 1 in secure position at the lower side of the animal's body and these portions 1d and 1e are maintained securely in position by the straps 3 and 2 respectively so that vertical displacement of the cover 1 at the rear portion of the animal is effectively prevented. It will be noted that the intermediate portion 1f of the cover 1 extends downwardly over opposite sides of the animal and substantially surrounds the animal's rump so that lateral displacement of the rear portion of the cover 1 is prevented; thus the cover 1 provides a very versatile garment for the animal and effectively protects her while worn.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a protective cover for animals, the combination of a cover member having opposite ends and sides of flexible material having neck and tail openings therein adapted to be positioned over the back of the animal permitting the head and tail of the animal to project therethrough, chest and belly covering portions integral with the main portion of said cover extending from opposite ends of said cover and adapted to be positioned intermediate the front and rear legs of the animal, and straps projecting from opposite sides of said chest and belly cover portions extending upwardly over the back of the animal intermediate the neck and tail openings of said cover, said belly covering portion having continuous integral side and rear rump-enclosing portions.

2. In a protective cover for animals, the combination of a cover member having opposite ends and sides and neck and tail openings therein, a strap in connection with each opposite end of said cover in spaced relationship with said neck and tail openings whereby opposite ends of said cover are placed beneath the belly and the chest of an animal respectively when worn, a portion of said cover providing a continuous enclosure for the rear and sides of an animal's rump, below the animal's tail.

3. In a protective cover for animals, the combination of a cover member having opposite ends and sides and neck and tail openings therein, a strap in connection with each opposite end of said cover in spaced relationship with said neck and tail openings whereby opposite ends of said cover are placed beneath the belly and the chest of an animal respectively when worn, a portion of said cover providing a continuous enclosure for the rear and sides of an animal's rump, below the animal's tail, said straps extending over the back of the animal wearing said cover intermediate the neck and tail openings therein.

4. In a protective cover for animals, the combination of a cover member having opposite ends and sides and neck and tail openings therein, a strap in connection with each opposite end of said cover in spaced relationship with said neck and tail openings whereby opposite ends of said cover are placed beneath the belly and the chest of an animal respectively when worn, a portion of said cover providing a continuous enclosure for the rear and sides of an animal's rump, below the animal's tail, said straps extending over the back of the animal wearing said cover intermediate the neck and tail openings therein for holding said opposite ends of said cover in secure position under the belly and chest of the animal.

5. In a protective cover for animals of the class described, a cover member having opposite ends and sides and neck and tail openings therein, an integral portion of said cover extending from each of the neck and tail openings toward said opposite ends and adapted to be positioned intermediate the four legs of the animal at the lower side of the animal's body, a portion of said cover providing a continuous enclosure for the rear and sides of an animal's rump, below the animal's tail.

6. In a protective cover for animals of the class described, a cover member having opposite ends and sides and neck and tail openings therein, an integral portion of said cover extending from each of the neck and tail openings toward said opposite ends and adapted to be positioned intermediate the four legs of the animal at the lower side of the animal's body, a portion of said cover providing a continuous enclosure for the rear and sides of an animal's rump, below the animal's tail, a strap in connection with the end of said cover intermediate the four legs of said animal's body extending upwardly and over the back of the animal's body when wearing said cover.

7. In a protective cover for animals of the class described, a cover member having opposite ends and sides and neck and tail openings therein, an integral portion of said cover extending from each of the neck and tail openings toward said opposite ends and adapted to be positioned intermediate the four legs of the animal at the lower side of the animal's body, a portion of said cover providing a continuous enclosure for the rear and sides of an animal's rump, below the animal's tail, a strap in connection with the end of said cover intermediate the four legs of said animal's body extending upwardly and over the back of the animal's body when wearing said cover, a similar extending portion on the opposite end of said cover spaced from said tail opening adapted to extend between the rear legs of an animal for covering the animal's belly.

8. In a protective cover for animals of the class described, a cover member having opposite ends and sides and neck and tail openings therein, an integral portion of said cover extending from each of the neck and tail openings toward said opposite ends and adapted to be positioned intermediate the four legs of the animal at the lower side of the animal's body, a portion of said cover providing a continuous enclosure for the rear and sides of an animal's rump, below the animal's tail, a strap in connection with the end of said cover intermediate the four legs of said animal's body extending upwardly and over the back of the animal's body when wearing said cover, a similar extending portion on the opposite end of said cover spaced from said tail opening adapted to extend between the rear legs of an animal for covering the animal's belly, a second strap in connection with the portion of said cover positioned beneath the animal's belly extending upwardly over the back of the animal when wearing the cover.

9. In a protective cover for animals of the class described, a cover member having opposite ends and sides and neck and tail openings therein, an integral portion of said cover extending from each of the neck and tail openings toward said opposite ends and adapted to be positioned intermediate the four legs of the animal at the lower side of the animal's body, a portion of said cover providing a continuous enclosure for the rear and sides of an animal's rump, below the animal's tail, a strap in connection with the end of said cover intermediate the four legs of said animal's body extending upwardly and over the back of the animal's body when wearing said cover, a similar extending portion on the opposite end of said cover spaced from said tail opening adapted to extend between the rear legs of an animal for covering the animal's belly, a second strap in connection with the portion of said cover positioned beneath the animal's belly extending upwardly over the back of the animal when wearing the cover, and fastening means for both of said straps.

10. In a protective cover for animals, the combination of a cover member having opposite ends and sides of flexible material having neck and tail openings therein adapted to be positioned over the back of the animal permitting the head and tail of the animal to project therethrough, chest and belly covering portions integral with the main portion of said cover extending to opposite ends of said cover and adapted to be positioned intermediate the front and rear legs of the animal and straps projecting from opposite sides of said chest and belly cover portions extending upwardly over the back of the animal intermediate the neck and tail openings of said cover, said belly covering portion having continuous integral side and rear rump-enclosing portions, and an absorbent pad in spaced relation with said tail opening on the inner side of said cover.

WILBA A. BAILEY.

REFERENCES CITED

The following references are of record in the file of this patent:

UNITED STATES PATENTS

| Number | Name | Date |
|---|---|---|
| 1,437,255 | Mallinson | Nov. 28, 1922 |
| 2,190,115 | Fuqua | Feb. 13, 1940 |

FOREIGN PATENTS

| Number | Country | Date |
|---|---|---|
| 255,135 | Germany | Dec. 30, 1912 |